United States Patent [19]
Jewett et al.

[11] Patent Number: 5,771,920
[45] Date of Patent: Jun. 30, 1998

[54] DOMESTIC WATER VALVE ASSEMBLY

[75] Inventors: Warren R. Jewett, Cary; Perry A. Genova, Chapel Hill, both of N.C.

[73] Assignee: FloLogic, Inc., Raleigh, N.C.

[21] Appl. No.: 905,587

[22] Filed: Aug. 4, 1997

[51] Int. Cl.⁶ .................................................. F16K 17/00
[52] U.S. Cl. ........................ 137/460; 137/456; 137/487.5
[58] Field of Search .............................. 137/460, 487.5, 137/456

[56] References Cited

U.S. PATENT DOCUMENTS

| | | | |
|---|---|---|---|
| 4,518,955 | 5/1985 | Meyer | 137/460 |
| 5,000,224 | 3/1991 | Olson, Jr. et al. | 137/487.5 |
| 5,004,014 | 4/1991 | Bender | 137/487.5 |
| 5,038,820 | 8/1991 | Ames et al. | 137/487.5 |
| 5,076,321 | 12/1991 | Terry | 137/460 |
| 5,251,653 | 10/1993 | Tucker et al. | 137/487.5 |
| 5,409,037 | 4/1995 | Wheeler et al. | 137/487.5 |
| 5,638,847 | 6/1997 | Hoch, Jr. et al. | 137/460 |

*Primary Examiner*—Denise L. Ferensic
*Assistant Examiner*—Joanne Y. Kim
*Attorney, Agent, or Firm*—Kane, Dalsimer, Sullivan, Kurucz, Levy, Eisele and Richard

[57] ABSTRACT

A domestic water valve assembly protects against water leaks by closing a valve if a leak is detected. A leak is detected when a water flow rate falls below a predetermined low flow rate for a length of time longer than a predetermined time-out period or when the water flow rate exceeds a predetermined high flow rate. The predetermined high flow rate, low flow rate, and time-out period may be changed by an operator. When a leak is detected, a control system activates an electric motor to close a valve, the valve remaining closed until reset by the operator.

14 Claims, 5 Drawing Sheets

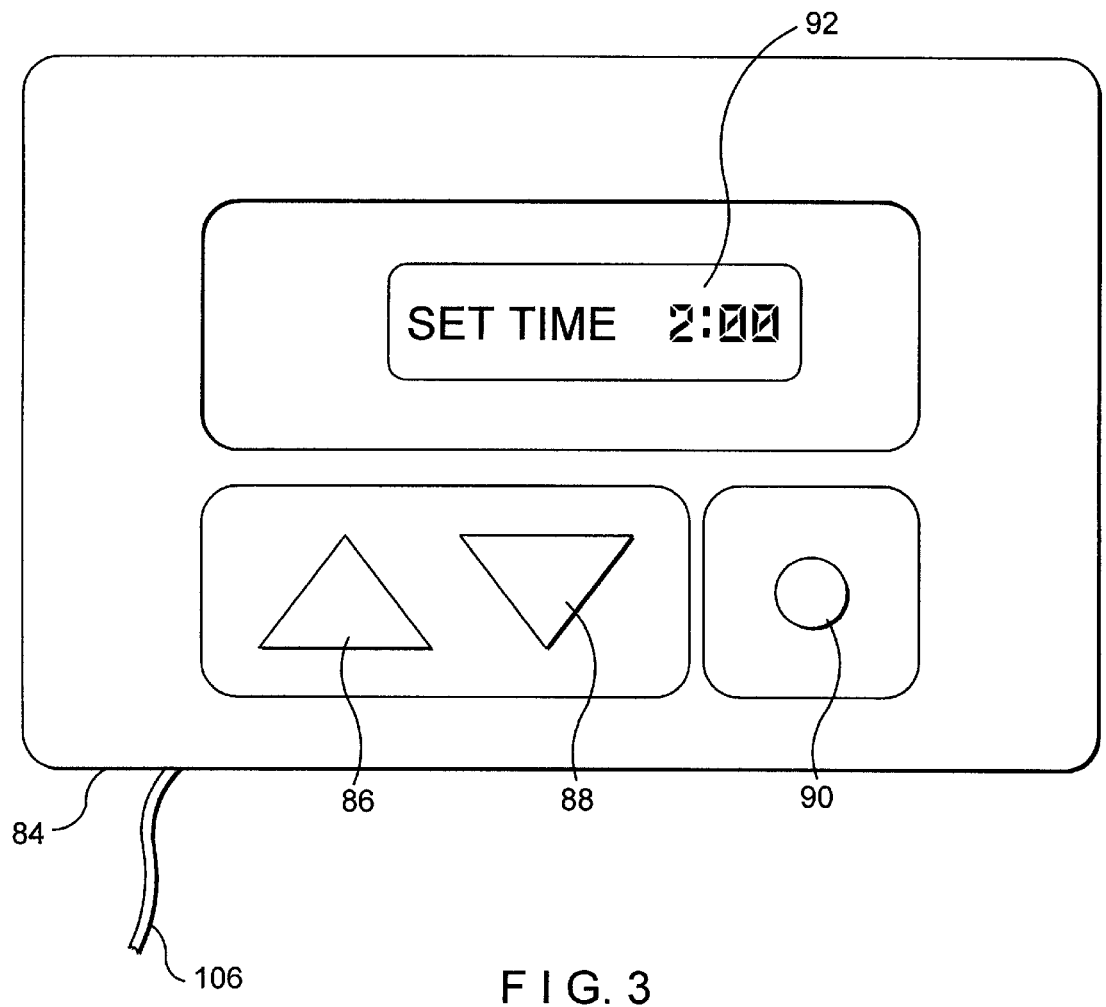
F I G. 3
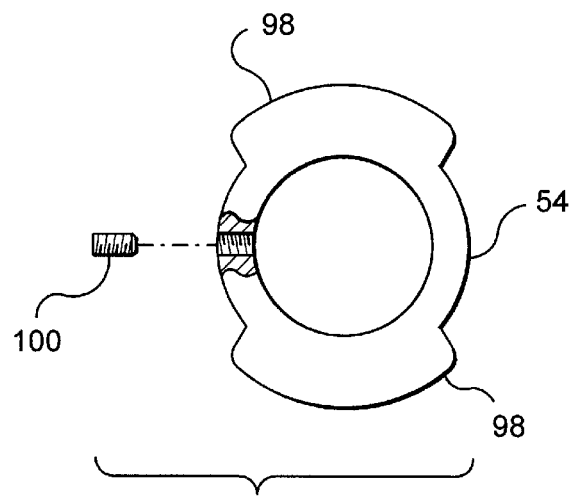
F I G. 4

DOMESTIC WATER VALVE ASSEMBLY

BACKGROUND OF THE INVENTION

1. Field of the Invention

The invention is related to valves, and, more particularly, to a domestic water valve assembly for shutting off a water flow in a domestic water distribution system if a catastrophic leak condition or a trickle leak condition is detected.

2. Brief Description of Related Art

The art is replete with descriptions for monitoring water distribution lines for unusual flow patterns. Representative of the descriptions found in the literature are those given in U.S. Pat. Nos. 4,180,088, 4,249,565, 4,589,435, 4,911,200, 4,926,901, 4,984,601, 5,00,224, 5,090,436, 5,267,587, and 5,447,173. No single system described in the literature meets all of the criteria for an ideal, problem-free, low maintenance and low cost system. For example, U.S. Pat. No. 5,267,587 describes an automatic monitoring and shut-off system for utilities to allow a user to permit certain uses of the utilities without triggering shutoff. Pressure transducers are used to sense a pressure change of the utility, which is indicative of a fluid flow. Solenoid valves are energized to stop the fluid flow in the event that the length of time of the fluid flow exceeds a predetermined trigger time delay. The pressure transducers, which include temperature compensation signal conditioners, and the solenoid valves add to the cost of the system, making such a system too expensive for ordinary household use.

U.S. Pat. No. 5,000,224 describes a water shut-off valve assembly that utilizes a normally open, hydraulically actuated shut-off valve controlled by a low voltage solenoid actuated control valve. A flow switch is connected to a timer, which measures each period of time that the flow switch is closed by virtue of water flowing through a flow detection unit. If the timer detects that the flow switch has been closed for a continuous predetermined period, the timer signals the control valve to cause the shut-off valve to close. The flow detection unit has a vertical inlet and a vertical flow passage, the vertical flow passage having a vertically movable switch actuating member. In the event of a catastrophic leak, such as a burst downstream pipe, a significant volume of water will be ejected from the site of the leak before shut-off valve is closed. Thus, the effectiveness of the water shut-off valve assembly is critically limited. Systems having similar limitations are described in U.S. Pat. Nos. 4,589,435, 4,911,200 and 4,926,901.

Thus, there is a need for a domestic water valve assembly, which can stop a flow of water in the event of either a catastrophic leak condition or a trickle leak condition. Therefore, in order to alleviate these problems, an objective of the present invention is to provide a domestic water valve assembly that can detect a catastrophic leak condition and close a valve to stop the flow of water. Another objective of the present invention is to provide a domestic water valve assembly that can detect a trickle leak condition and close a valve to stop the flow of water.

SUMMARY OF THE INVENTION

The above and other beneficial objects are obtained in accordance with the present invention by providing a domestic water valve assembly having a housing and a control panel. The housing includes a water inlet for receiving a flow of water from a domestic water supply, a water outlet for supplying water to downstream distribution points, a vane rotatable about an axis in proportion to the rate of flow of the water and a valve controlled by the control panel for stopping the flow of water immediately when a catastrophic leak condition is detected or after a predetermined time-out period has elapsed when a trickle leak condition is detected. The control panel includes: (1) a memory section for storing a predetermined high flow rate, a predetermined low flow rate and a predetermined time-out period; (2) a water flow detecting section for detecting the rate of water flowing through the housing; (3) a timer section for measuring the length of time that the water flow falls below the predetermined low flow rate; (4) a gear motor control section for controlling a motor for shutting the valve of the housing when a leak condition is detected; and (5)a display for displaying the condition of the domestic water valve assembly.

BRIEF DESCRIPTION OF THE DRAWINGS

In the accompanying drawings:

FIG. 3 is a front elevational view of a control panel of the domestic water valve assembly;

FIG. 4 is a top plan view of a cam of the domestic water valve assembly; and

DETAILED DESCRIPTION OF THE PREFERRED EMBODIMENTS OF THE INVENTION

Figure 1:
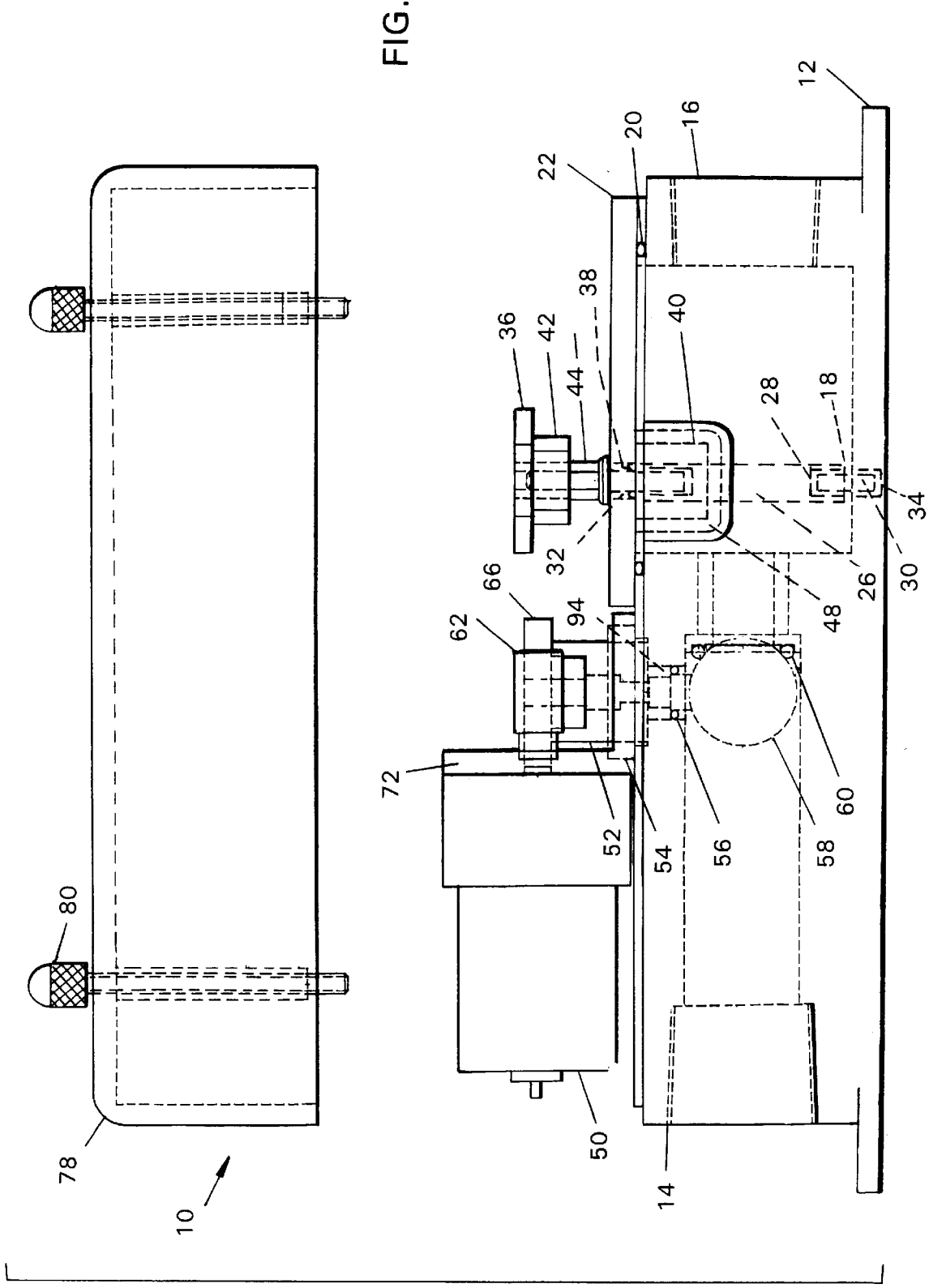
FIG. 1 is a front elevational view of a housing and a cover for the housing of a domestic water valve assembly.

Those skilled in the art will gain an appreciation of the invention when viewed with the accompanying drawings of FIGS. 1–5, inclusive. The individual reference characters designate the same or similar elements throughout the drawings.

Figure 2:
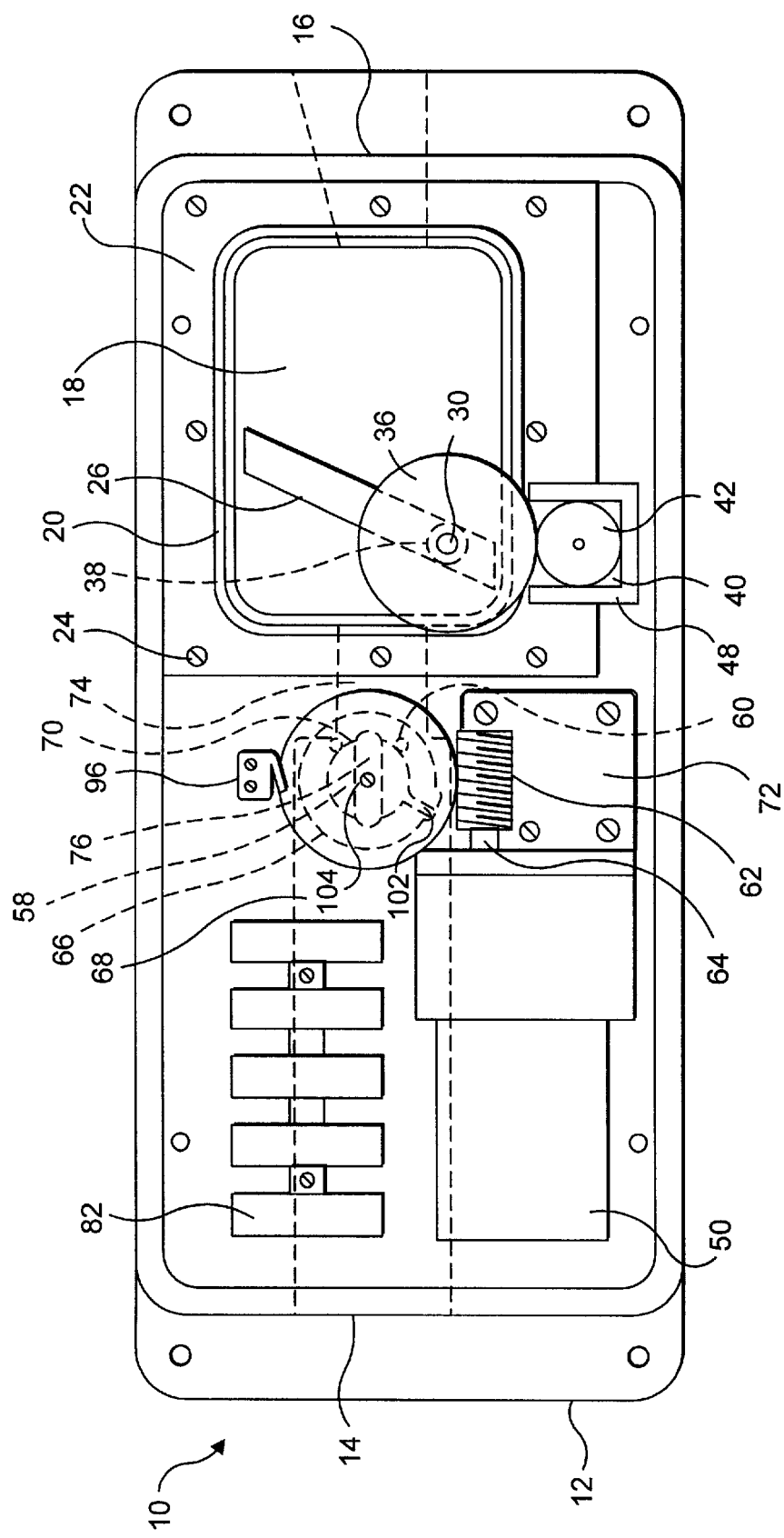
FIG. 2 is a top plan view of the housing of the domestic water valve assembly.

FIG. 1 is a front elevational view and FIG. 2 is a top plan view of a domestic water valve assembly 10. Domestic water valve assembly 10 includes a housing 12 having a water inlet 14 for receiving water from a water source, not shown, and a water outlet 16 for supplying water from the water source to downstream distribution points. Cover 78 is provided to encase the components of domestic water valve assembly 10 and to protect the same from contamination. Cover 78 is attached to housing 12 by four thumb screws 80.

Housing 12 may be made of any material that will withstand a water environment and standard domestic water pressure but is preferably made of polyvinyl chloride (PVC). Water inlet 14 may be of any design that will permit housing 12 to be connected to a domestic water supply. Similarly, water outlet 16 may be of any design that will permit housing 12 to be connected to downstream water distribution points, such as a domestic appliance. Preferably, water inlet 14 and water outlet 16 are designed to accept ¾-inch standard pipe. Couplings, not shown, may be used as needed to connect water inlet 14 to the domestic water supply and water outlet 16 to the downstream water distribution points.

Water inlet 14 is in fluid communication with water outlet 16 through a water passage 68, a water passage 74 and a chamber 18. Water passage 68 is preferably a bore through housing in fluid communication with water passage 74 of decreased diameter. Water passage 74 is in fluid communication with chamber 18, which has a generally rectangular shape, and chamber 18 is in fluid communication with water outlet 16. At the general juncture of water passage 68 and water passage 74 is a ball valve having a valve stem 58. Valve stem 58 is a generally spherical member with a stem portion projecting up therefrom. The generally spherical member has a hole 76 for allowing water to flow through the generally spherical member when hole 76 is aligned with water passage 68 and water passage 74. A valve seat 70 is located at the juncture between the generally spherical member of valve stem 58 and water passage 74. A seal 60 is provided in valve seat 70 to fluidly seal water passage 68 from water passage 74 when the ball valve is in a closed position, that is, when the generally spherical member of valve stem 58 is rotated such that the longitudinal axis of hole 76 is perpendicular to the longitudinal axes of water passage 68 and water passage 74. The stem portion of valve stem 58 projects through hole 94 of housing 12. A seal 56 provides a fluid tight passage for the stem portion of valve stem 58.

The stem portion of valve stem 58 is connected inline with a cam 54, a coupling 52 and a worm gear 66. As illustrated in FIG. 4, cam 54 has a generally ring shape with two camming surfaces 98. Coupling 52 generally functions as a support for cam 54 and worm gear 66 and to align worm gear 66 to mesh with worm 62. Relative rotation of cam 54 with respect to coupling 52 is prevented by set screw 100, and relative rotation of worm gear with respect to coupling is prevented by set screw 102. Relative rotation of cam 54, coupling 52 and worm gear 66 with respect to valve stem 58 is prevented by complimentary profiles of the stem portion of valve stem 58 and inner bore of coupling 52. The assembly of cam 54, coupling 52 and worm gear 66 may be connected to valve stem 58 by a screw 104 to further prevent relative rotation between valve stem 58 and the assembly of cam 54, coupling 52 and worm gear 66.

Gear motor 50 is mounted onto the top surface of housing 12 by means of motor bracket 72, which is generally L-shaped, so that a worm 62 mounted on shaft 64 of gear motor 50 meshes with worm gear 66. Worm 62 is preferably press fit onto shaft 64. When gear motor 50 is activated, the rotation of worm 62 causes rotation of worm gear 66, thus causing rotation of cam 54, coupling 52 and valve stem 58. The angular position of hole 76 determines whether water is permitted to flow through housing 12. A switch 96 is mounted on housing 12 in proximity to cam 54 so that camming surfaces 98 depress the cantilever member of switch 96, closing switch 96, when the valve stem 58 is in a fully opened or fully closed position. Switch 96 is in an open condition during opening and closing of valve stem 58 since camming surfaces 98 are positioned away from the cantilever member during such opening and closing of valve stem 58.

Housing 12 has a chamber 18 having a generally rectangular shape and being in fluid communication with water outlet 16 and water passage 74. Cover 22 and seal 20 are provided to fluid tightly seal chamber 18. Cover 22 may be made of any material that will withstand a water environment and domestic water pressure. Preferably, cover 22 is made of clear polycarbonate to permit an operator to view the operation of the domestic water valve assembly 10. A vane 26 is vertically disposed within chamber 18 and at an oblique angle to the direction of the flow of water. Generally near one end of vane 26 are holes 28 for receiving pins 30. Chamber 18 and cover 22 each include holes 34 and 32, respectively, also for receiving pins 30. When vane 26 is installed in chamber 18, pins 30 are aligned with hole 34 and hole 32, and cover 22 is mounted onto housing 12 by screws 24. Thus, pins 30 define an axis about which vane 26 may rotate in response to water flowing through chamber 18. Seal 20 is installed between cover 22 and housing 12 to provide a fluid tight seal. The height of vane 26 is substantially equal to the depth of chamber 18 so that little or no water flows between the top of vane 26 and the bottom surface of cover 22 or between the bottom of vane 26 and the bottom surface of chamber 18. Vane 26 has chamfered ends so that the ends of the vane 26 are flush with the side walls of chamber 18 when there is no water flow through housing 12.

Pin 30 projects through hole 32, which is fluid tightly sealed by seal 38. Mounted on the upper end of pin 30 projecting through hole 32 is spur gear 36.

Spur gear 36 may be press fit onto pin 30, and a set screw, not shown, may be used to prevent the relative rotation of spur gear 36 with respect to pin 30. Variable resistor 40 is mounted onto the lower surface of cover 22 and is fit into chamber 48 of housing 12. A spur gear 42 is mounted on the stem portion of variable resistor 40, which projects through cover 22, so that spur gear 42 meshes with spur gear 36. A torsion spring 44 is mounted on the stem portion of variable resistor 40 between spur gear 42 and cover 22. One end of torsion spring 44 is inserted into a hole, not shown, in the lower surface of spur gear 42, and the other end of torsion spring 44 is urged against pin 30. Thus, torsion spring 44, through spur gear 42 and spur gear 36, operates to bias vane 26 into a closed position, permitting any orientation of housing 12. Torsion spring 44 also eliminates backlash between spur gear 42 and spur gear 36, enhancing detection and increasing sensitivity during low flow rates. Water flowing through housing 12 causes vane 26 to rotate about pins 30 and, through spur gear 36 and spur gear 42, causes rotation of the shaft of variable resistor 40. Thus, the resistance of variable resistor 40 is in proportion to the angular rotation of vane 26, which is in proportion to the rate of water flowing through housing 12. Therefore, a measure of the resistance of variable resistor 40 is a measure of the rate of water flowing through housing 12 as will be more fully described below. Gear motor 50, switch 96 and variable resistor 40 are electrically connected to respective terminals of terminal strip 82, which is mounted onto housing 12.

FIG. 3 illustrates a control panel 84 of domestic water valve assembly 10. Control panel 84 is in electrical communication with gear motor 50, switch 96 and variable resistor 40 through control wire 106, the leads of which are connected to respective terminals of terminal strip 82. Control panel 84 includes a microprocessor-based control system for controlling the operation of domestic water valve assembly 10. Control panel 84 preferably operates from a standard 110-volt power source reduced to 12-volt DC through a voltage regulator, not shown. Preferably, a battery backup power source, not shown, is provided to power control panel 84 in the event of a power failure.

Control panel 84 includes an up button 86, a down button 88, a stop/reset button 90 and a display 92. Control panel 84 includes a timer section, a water flow detecting section, a gear motor control section and a memory section. The memory section stores such values as a predetermined time-out period, a predetermined high flow rate and a predetermined low flow rate. Up button 86 and down button 88 perform several functions, alone and in combination. Depressing up button 86 alone increases the predetermined time-out period, and depressing down button 88 alone decreases the predetermined time-out period. Depressing up button 86 and down button 88 simultaneously causes control panel 84 to enter a high flow rate setting mode. When control panel 84 is in the high flow rate setting mode, depressing up button 86 increases the predetermined high flow rate and depressing down button 88 decreases the predetermined high flow rate. Depressing and holding up button 86 and down button 88 simultaneously causes control panel 84 to enter a low flow rate setting mode. When control panel 84 is in the low flow rate setting mode, depressing up button 86 increases the predetermined low flow rate and depressing down button 88 decreases the predetermined low flow rate. When domestic water valve assembly 10 is in a normal operating mode, stop/reset button 90 operates as an emergency shut-off switch. When control panel 84 has closed valve stem 58 in response to a leak condition, stop/reset button 90 operates to reset control panel 84 and signal control panel 84 to open valve stem 58. Depressing up button 86, down button 88 and stop/reset button 90 simultaneously disables control panel 84 as well as the automatic operation of valve stem 58. However, the flow rate measurement function of control panel 84 continues to operate when control panel 84 and automatic operation of valve stem 58 are disabled.

Display 92 is provided to display information to an operator as to the condition of domestic water valve assembly 10. Display 92 is preferably an alphanumeric liquid crystal display (LCD) screen. When power is initially applied to control panel 84, control panel initializes and self-calibrates, displaying the message "Calibrating . . . " on display 92. When control panel 84 is in the high flow rate setting mode, display 92 displays the message "Hi Flow x GPM", where "x" denotes the predetermined high flow rate, which changes in response to an operator changing the high flow rate. When control panel 84 is in the low flow rate setting mode, display 92 displays the message "Lo Flow x Pints/Min", where "x" denotes the predetermined low flow rate, which changes in response to an operator changing the low flow rate. Additional messages are displayed in accordance with the condition of control panel 84 and domestic water valve assembly 10.

Figure 5A:
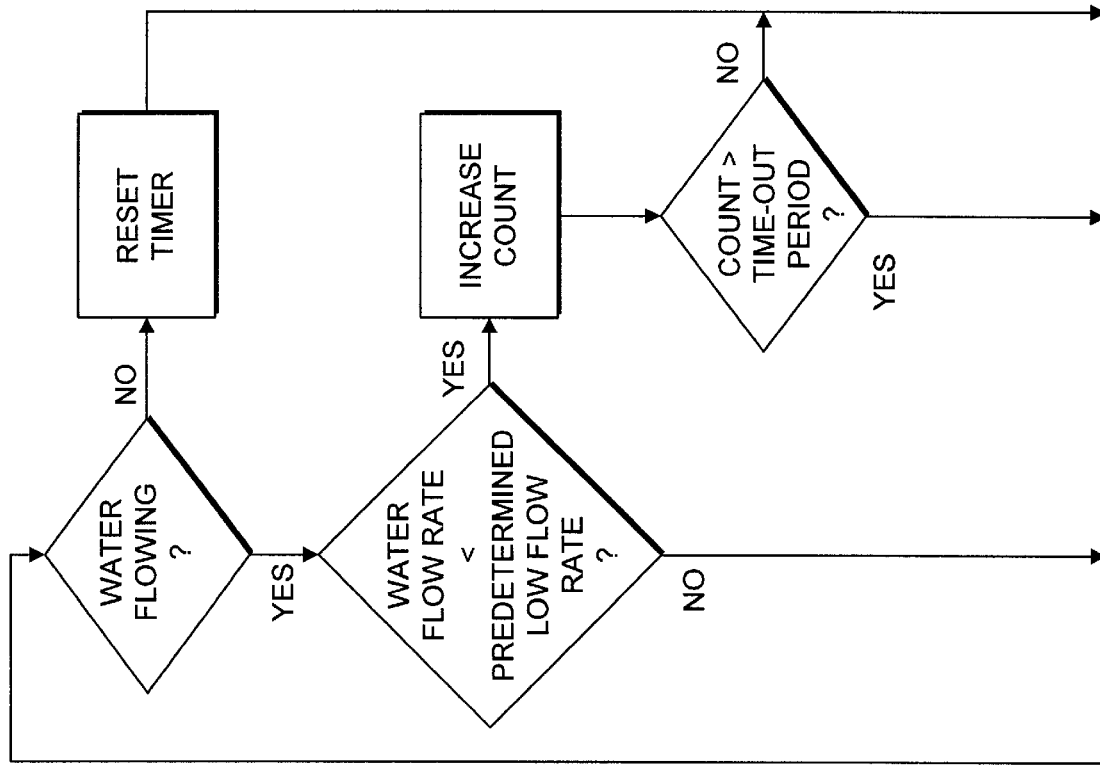
FIG. 5 is a schematic flow chart of the software used to operate the control panel of FIG. 3.
Figure 5A:
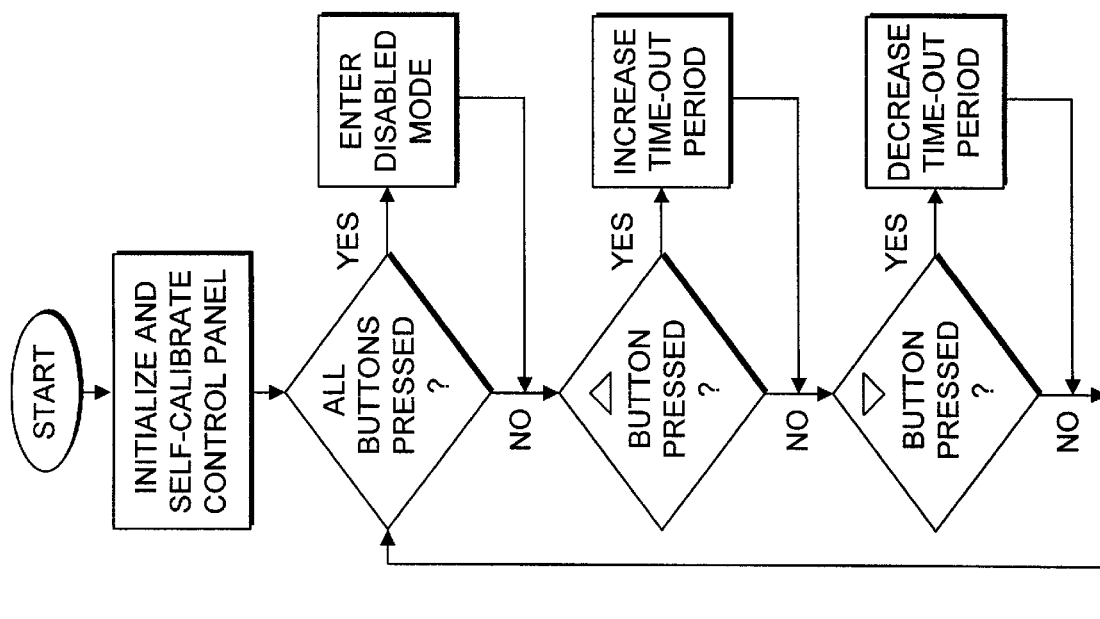
Figure 5B:
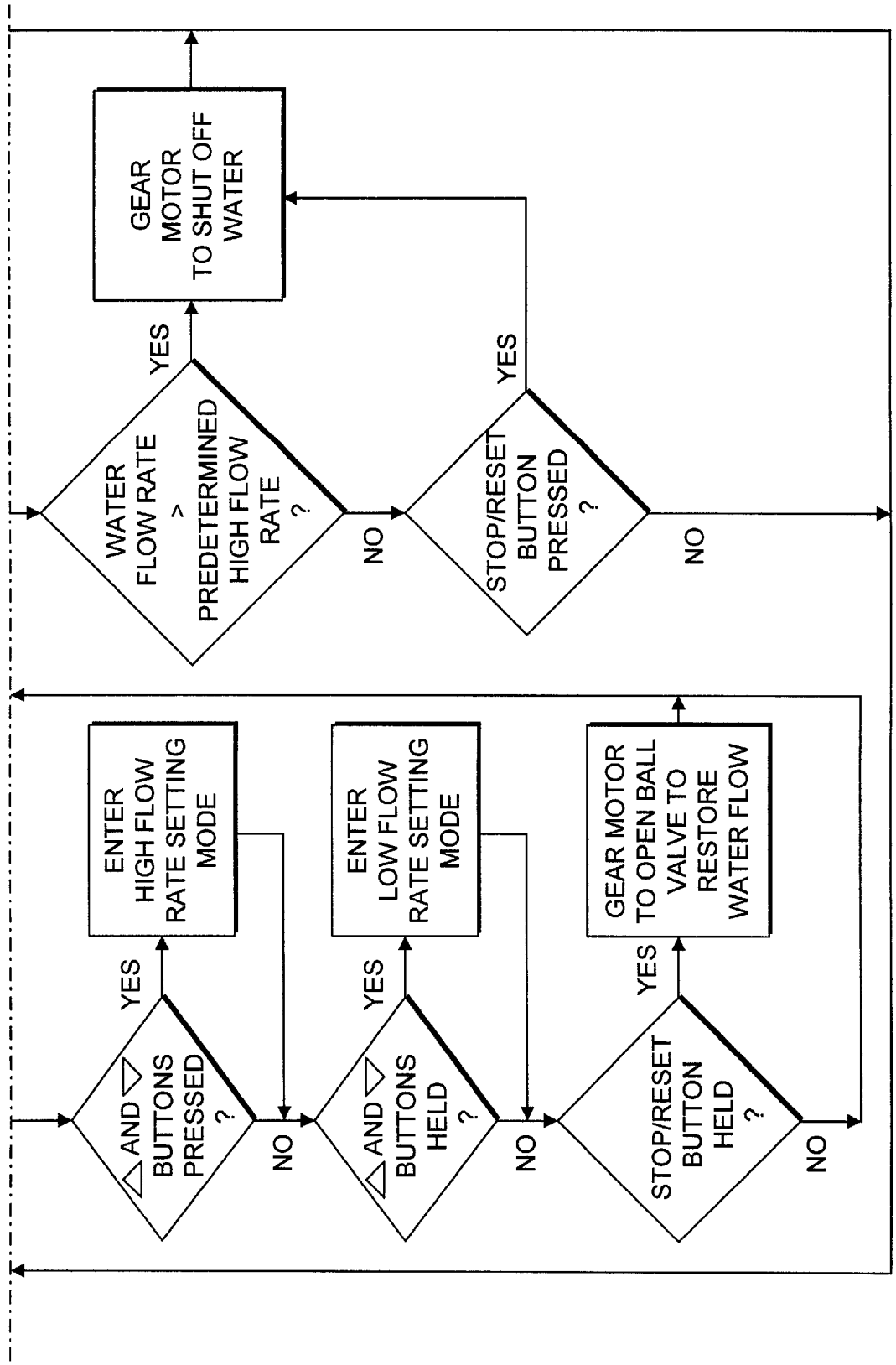

Referring now to FIG. 5 of the accompanying drawings, the operation of domestic water valve assembly 10 is set forth in detail. When no water is flowing through housing 12, that is, when there is no downstream demand for water, torsion spring 44, through spur gear 42 and spur gear 36, urges the chamfered sides of vane 26 against the side walls of chamber 18. Control panel 84 must be initialized when there is no water flowing through housing 12 so that the resistance of variable resistor 40 when vane 26 is in a zero flow condition can be used by control panel 84 as a datum value. This datum value is measured by control panel 84 during initialization and self-calibration. To ensure a zero flow condition during initialization and calibration, control panel 84 causes valve stem 58 to close at the beginning of the calibration sequence and causes valve stem 58 to open once the datum value has been measured. During initialization and calibration, display 92 displays the message "Calibrating . . . ". Water flowing through housing 12 causes vane 26 to rotate about pins 30 in proportion to the rate of water flow. The angular displacement of vane 26 changes the resistance of variable resistor 40, which is measured by control panel 84 to determine whether water is flowing through housing 12 and, if so, whether the flow rate exceeds the predetermined high flow rate or whether the flow rate falls below the predetermined low flow rate.

A flow rate exceeding the predetermined high flow rate is indicative of a catastrophic water leak, such as a burst downstream pipe. In such a condition, control panel 84 immediately energizes gear motor 50 to close valve stem 58. As valve stem 58 closes, camming surface 98 of cam 54 rotates with respect to switch 96, causing the state of switch 96 to change from a closed condition to an open condition. The state of switch 96 is used by control panel 84 to determine whether valve stem 58 is in an open or closed condition or whether valve stem 58 is being opened or closed. As valve stem 84 approaches the closed position, camming surface 98 causes switch 96 to change state from an open condition to a closed condition, signaling control panel 84 to stop gear motor 50. Once valve stem 58 has been completely closed, display 92 displays the message "Hi flow shutoff". Valve stem 58 will remain in the closed position until an operator depresses stop/reset button 90, at which time control panel 84 will signal gear motor 50 to open valve stem 58 and sense the condition of valve stem 58 based on the state of switch 96 as described above. During the reset process, display 92 displays the message "Resetting".

A flow rate that falls below the predetermined low flow rate for a period of time greater than the time-out period is indicative of a trickle leak, such as a faulty downstream seal. A trickle leak will cause vane 26 to rotate about pins 30 at a slight angle. When control panel 84, through variable resistor 40, detects a flow of water, the flow rate of which is below the predetermined low flow rate, the timer section of control panel 84 will begin timing the low flow condition. Simultaneously, display 92 will cycle through the messages "Flow<x Pints/Min", "Shutoff in . . . " and "h:mm:ss", where "x" represents the predetermined minimum flow rate and "h:mm:ss" represents the time remaining in the time-out period before control panel 84 will energize gear motor 50 to close valve stem 58 as described above. If the rate of water flow increases to a rate above the predetermined low flow rate or if the water flow ceases, the timer section of control panel 84 will be reset until such time as a low flow condition resumes. Resetting control panel 84 and valve stem 58 is accomplished as described above.

Stop/reset button 90 has the further function of acting as an emergency shut-off. During a normal condition of domestic water valve assembly 10, an operator depressing stop/reset button 90 will cause control panel 84 to energize gear motor 50 to close valve stem 58 as described above. Display 92 will display the message "Emergency off" simultaneously with an operator depressing stop/reset button 90. Resetting control panel 84 and valve stem 58 is accomplished as above.

During the normal operating condition of domestic water valve assembly 10, control panel 84 is in a time-out period setting mode. When in this mode, display 92 displays the message "Set time: mm:ss", where "mm:ss" represents the predetermined time-out period. When in this mode, up button 86 and down button 88 function to increase and decrease the predetermined time-out period, respectively, updating the predetermined time-out period displayed on display 92.

Thus, the several aforementioned objects and advantages of the present invention are most effectively attained. Those skilled in the art will appreciate that many modifications of the preferred embodiment described above may be made without departing from the spirit and scope of the invention. Although a single preferred embodiment of the invention has been disclosed and described in detail herein, it should be understood that this invention is in no sense limited thereby and its scope is to be determined by that of the appended claims.

What is claimed is:

1. A domestic water valve assembly, comprising:

a housing, said housing having a water inlet in fluid communication with a water outlet;

a means for determining a flow rate of a flow of water from said water inlet through said housing and out said water outlet;

a means for storing a predetermined high flow rate, a predetermined low flow rate and a predetermined time-out period;

a means for comparing said flow rate of water with said predetermined high flow rate and said predetermined low flow rate; and a means for controlling said flow of water;

wherein said controlling means stops said flow of water when said flow rate of water exceeds said predetermined high flow rate;

and wherein said controlling means stops said flow of water when said flow of water is detected by said determining means and said flow rate of water falls below said predetermined low flow rate for a length of time exceeding said predetermined time-out period.

2. The domestic water valve assembly according to claim 1, wherein said determining means includes a vane disposed within a cavity of said housing, said flow of water flowing through said cavity, said vane being disposed obliquely to said flow of water and being pivotable about an axis, said flow of water causing said vane to rotate about said axis in proportion to said flow rate of water.

3. The domestic water valve assembly according to claim 2, wherein said determining means further comprises a sensor for measuring said rotation of said vane.

4. The domestic water valve assembly according to claim 3, wherein said sensor is a variable resistor.

5. The domestic water valve assembly according to claim 1, wherein said controlling means includes a valve.

6. The domestic water valve assembly according to claim 5, wherein said valve is a ball valve.

7. The domestic water valve assembly according to claim 5, wherein said controlling means further comprises an electro-mechanical means for opening and closing said valve.

8. The domestic water valve assembly according to claim 7, wherein said electro-mechanical means comprises an electric motor.

9. The domestic water valve assembly according to claim 1, wherein said controlling means includes a means for setting said predetermined high flow rate.

10. The domestic water valve assembly according to claim 1, wherein said controlling means includes a means for setting said predetermined low flow rate and said predetermined time-out period.

11. The domestic water valve assembly according to claim 1, wherein said controlling means includes a means for resetting said valve to an open condition.

12. The domestic water valve assembly according to claim 1, wherein said controlling means includes a means for closing said valve in response to an operation by an operator.

13. The domestic water valve assembly according to claim 1, wherein said controlling means includes a means for displaying a condition of said domestic water valve assembly.

14. The domestic water valve assembly according to claim 1, wherein said controlling means includes a battery for supplying power to said controlling means.

\* \* \* \* \*